Figure 1:
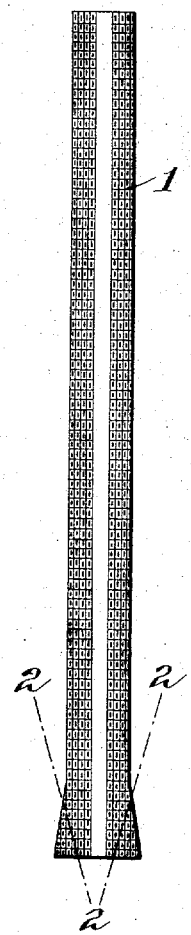

T. A. EDISON & J. W. AYLSWORTH.
STORAGE BATTERY ELECTRODE.
APPLICATION FILED APR. 28, 1905.

976,791.

Patented Nov. 22, 1910.
2 SHEETS—SHEET 1.

Attest:
Edgeworth Greene
Anna R. Klehm

Inventors:
Thomas A. Edison
Jonas W. Aylsworth
by Frank L. Dyer, Atty.

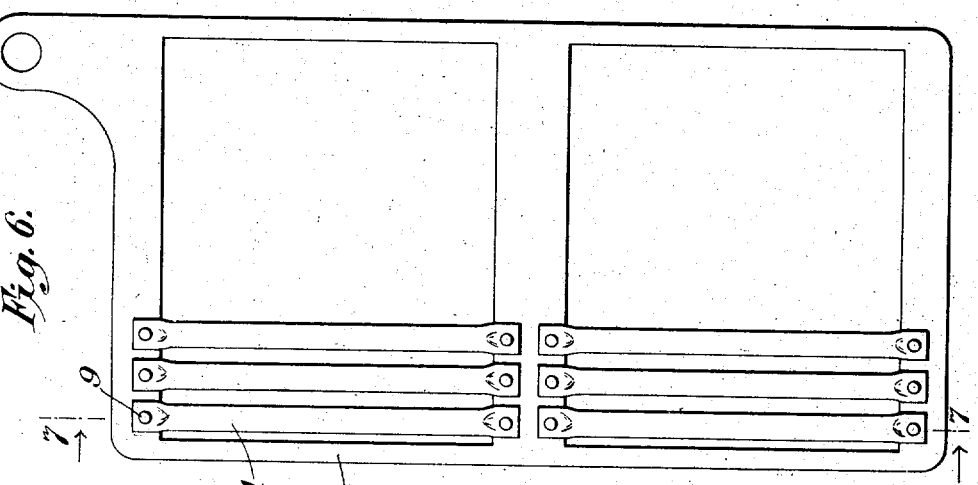
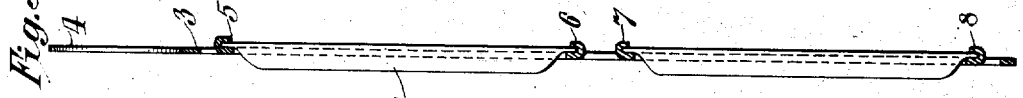
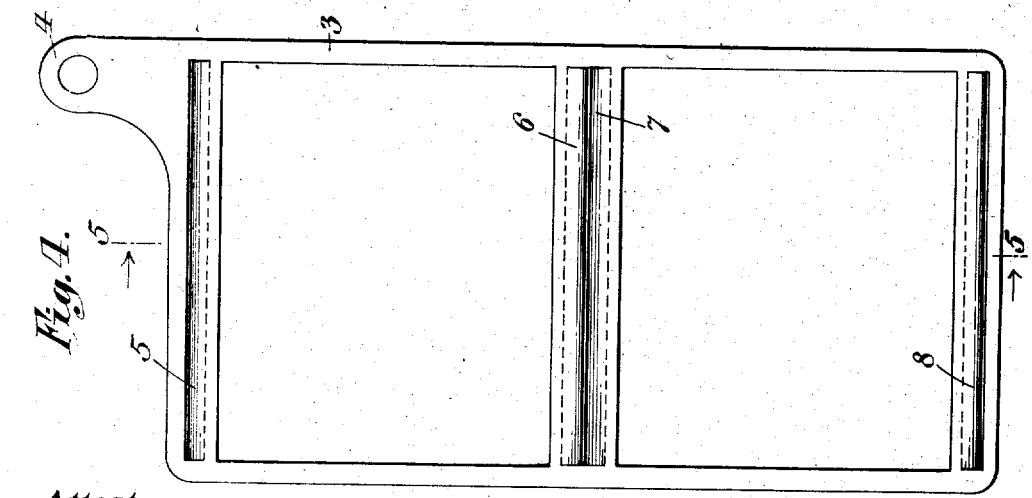

UNITED STATES PATENT OFFICE.

THOMAS A. EDISON, OF LLEWELLYN PARK, ORANGE, AND JONAS W. AYLSWORTH, OF EAST ORANGE, NEW JERSEY, ASSIGNORS TO EDISON STORAGE BATTERY COMPANY, OF WEST ORANGE, NEW JERSEY, A CORPORATION OF NEW JERSEY.

STORAGE-BATTERY ELECTRODE.

976,791.

Specification of Letters Patent.

Patented Nov. 22, 1910.

Application filed April 28, 1905. Serial No. 257,807.

*To all whom it may concern:*

Be it known that we, THOMAS ALVA EDISON, a citizen of the United States, residing at Llewellyn Park, Orange, county of Essex, and State of New Jersey, and JONAS W. AYLSWORTH, a citizen of the United States, residing at 223 Midland avenue, East Orange, county of Essex, and State of New Jersey, have invented certain new and useful Storage-Battery Electrodes, of which the following is a description.

Our invention relates to various new and useful improvements in storage battery electrodes of the Edison type, wherein an alkaline electrolyte is used with insoluble active materials maintained under pressure within perforated insoluble pockets or receptacles. In the practical commercial development of the Edison battery, difficulty has been experienced on the nickel side, owing to the swelling of the active mass, bulging the inclosing pockets outwardly, affecting the contact between the active particles themselves and between the active particles and the inclosing pockets, and increasing the likelihood of short circuits between adjacent plates of opposite polarity.

Our invention relates, therefore, particularly to the construction of the positive electrodes, using nickel hydrate as the active mass, the latter being admixed with flakes or scales of an insoluble conducting material, preferably cobalt or a cobalt-nickel alloy, as disclosed in the application of Thomas A. Edison, filed March 30, 1905, Serial No. 252,935.

Our object is to provide an improved construction for storage battery electrodes whereby the electrodes may be assembled very cheaply, great durability will be secured, a high efficiency obtained and any possibility overcome of poor contacts, due to excessive swelling or bulging of the inclosing pockets.

To this end, the invention consists in utilizing pockets in the form of small perforated tubes with closed ends and containing the active material under pressure, and preferably supported vertically side by side in one or more horizontal rows in the grid or electrode frame, the diameter of each pocket being small enough to prevent the central portion of the active mass therein from being relatively isolated electrolytically.

In order that the invention may be better understood, attention is directed to the accompanying drawings, forming a part of this specification, and in which—

Figure 2:
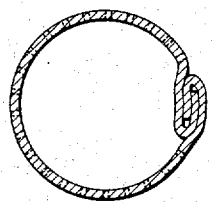
Figure 3:
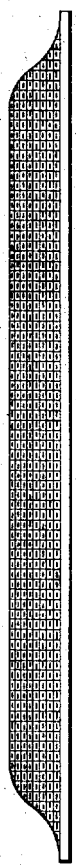

Figure 1 is an elevation of one of the tubular pockets, showing one of its ends closed. Fig. 2 is a horizontal sectional view on a greatly enlarged scale, showing the hook-lapped seam. Fig. 3 is an elevation, showing the ends of the tubular pocket compressed to close the same. Fig. 4 is a view in side elevation, showing one form of support for holding the tubular pockets. Fig. 5 is a vertical sectional view, showing the pockets in position therein. Fig. 6 is a side view showing a modified form of electrode support, the pockets being riveted in place, and Fig. 7 is a section on the line 7, 7 of Fig. 6.

In all of the above views, corresponding parts are represented by the same numerals of reference.

The pockets are formed of small tubes 1, rolled around a mandrel or former, with a hook-lapped seam, as shown in Fig. 2. Good results have been secured with tubes approximating $\frac{1}{4}$ of an inch in diameter, and $3\frac{1}{4}$ inches long, but obviously these dimensions may be widely varied. The diameter should not, however, be too great, because otherwise the central portion of each active unit would be objectionably removed from the conducting inclosing walls. The strips from which the tubular pockets are made are suitably perforated as shown, except the overlapping edges, which form the seam. These strips are formed either of thin sheet iron or nickel, preferably plated on both sides with a very thin coating (say—.0004″ in thickness) of a nickel-cobalt alloy in the proportion of 70 per cent. cobalt and 30 per cent. nickel. After this alloy is applied and before the strip is formed into tubular shape, the strips are subjected to a welding temperature in a hydrogen atmosphere, whereby the deposited coating of alloy will be intimately associated and welded to the nickel or iron base, and any condition of tension in said coating will be overcome. The strips so prepared are now made into tubes, as explained, after which the tubes are again subjected in a hydrogen atmosphere to a much higher temperature below the melting point,—say, a yellowish white heat, in order to weld the lapped seam and make each tube substantially continuous. The tubes are now closed at one end by compressing the same, as shown in Fig. 1, after which the projecting corners are turned over on the dotted lines 2, 2 (Fig. 1) in order that the flattened part of the tube may not extend beyond the diameter of its body portion. Through the upper ends of the tubes thus formed, we now introduce the active nickel material (nickel hydroxid) mixed with conducting flakes, composed preferably of cobalt or nickel-cobalt alloy. The active material is introduced in successive increments, a uniform tamping pressure being applied after the introduction of each increment, in order that the active material may be packed with a sufficient density within the tubes to give the desired pressure. When the tubes have thus been filled they are closed at their upper ends in the manner already described and are then ready to be assembled in a suitable grid or electrode support.

In Figs. 4 and 5, we show an arrangement in which the support 3 is in the form of a frame with an integral conducting lug or ear 4, and with two main cutaway portions in which the tubular pockets are arranged vertically in horizontal rows. The frame is provided with integral tongues 5, 6, 7 and 8, adapted to be turned over on the dotted lines, as will be understood, so as to engage the flattened ends of the tubular pockets, pressure being applied to hold the pockets rigidly in position. Instead of such an arrangement, the pockets may be secured to the grid or support by means of rivets 9, as shown in Figs. 6 and 7, it being noted that with this arrangement the center of the grid coincides with the axis of the pockets, so that uniformity in the spacing of the electrodes will be secured.

By means of the construction described, it will be evident that since the pockets or receptacles are tubular there can be no bulging or distortion of the pockets, due either to swelling of the active mass or to gas pressure within the same. To maintain the desired pressure on the active mass at all times in order that the requisite continuity of contact may be secured between the active particles and the conducting films, we find that by properly regulating the size of the perforations or apertures of the pockets, a sufficient retardation to the exit of any gas generated within the pocket can be secured to result in forcing the active particles outwardly against the inclosing walls, whereby the active particles will be held closely compacted together at all times to maintain the active particles in contact with the conducting films or flakes. The securing of this result also depends to a certain extent upon the viscosity of the solution, since with a very concentrated alkaline solution the apertures may be made larger to secure the same gas pressure within the mass as when a less concentrated solution is employed. An initial elastic pressure between the active particles and the conducting films or flakes and between the active particles and the conducting walls will also be secured by the gradual swelling of the mass in the solution, which swelling is limited and is maintained substantially constant after the limit is reached, and is independent of that resulting from absorption of oxygen during the charging operation, said absorption increasing the elastic pressure. Finally, elasticity within the mass will be secured when metallic conducting films or flakes are used, composed, for instance, of cobalt or cobalt-nickel alloy, and particularly, when such flakes or films are curled, wrinkled or of otherwise irregular shapes. By thus providing means within the mass for securing an elastic pressure outwardly, excellent contact may be obtained between the active particles when the containing receptacle is practically non-elastic, as described. Furthermore, since each unit of active material inclosed within each pocket is of comparatively small diameter, no portion thereof is removed from the conducting walls of the pocket to an objectionable extent, and substantially all the active material is electrolytically acted upon by the current, while at the same time sufficient circulation of the electrolyte is permitted, whereby a high efficiency can be secured.

Having now described our invention, what we claim as new therein and desire to secure by Letters Patent is as follows:

1. An electrode unit comprising a substantially non-deformable, perforated, inclosing pocket made from metal of a comparatively high tensile strength and active material compressed therein, and maintained under elastic pressure, substantially as set forth.

2. An electrode unit comprising a perforated substantially non-deformable, inclosing pocket made from metal of a comparatively high tensile strength and active material compressed therein, the perforations being of such size as to result in the retardation of any gas generated within the active mass to effect an elastic pressure of the active particles, substantially as set forth.

3. An electrode unit, comprising a tubular perforated non-active inclosing pocket made from metal of a comparatively high tensile strength and with closed ends, and active material compressed therein under elastic pressure, substantially as set forth.

4. An electrode unit, comprising a tubular perforated inclosing pocket, having closed ends and coated with cobalt-nickel alloy, and active material therein under elastic pressure, substantially as set forth.

5. An electrode unit, comprising a tubular perforated non-active, inclosing pocket made from metal of a comparatively high tensile strength and having a vertical welded seam and closed ends, and active material compressed therein under elastic pressure, substantially as set forth.

6. An electrode unit, comprising a tubular perforated non-active, inclosing pocket made from metal of a comparatively high tensile strength and with flattened ends and active material compressed therein under elastic pressure, substantially as set forth.

7. An electrode for storage batteries, comprising an electrode support and a series of tubular perforated non-active, inclosing pockets made from metal of a comparatively high tensile strength carried thereby, and containing active material under elastic pressure, substantially as set forth.

8. An electrode for storage batteries, comprising an electrode support and a line of vertically arranged tubular perforated non-active inclosing pockets made from metal of a comparatively high tensile strength carried throughout and containing active material under elastic pressure, substantially as set forth.

9. An electrode for storage batteries, comprising an electrode support, and a plurality of perforated tubular non-active, inclosing pockets, made from metal of a comparatively high tensile strength, riveted to said support and carrying active material under elastic pressure, substantially as set forth.

10. An electrode for storage batteries comprising a supporting skeleton frame and a plurality of perforated tubular pockets containing active material, the said pockets fitting within the openings in the skeleton frame being flattened to one side at the ends thereof and riveted at said flattened ends to the supporting frame and extending outwardly substantially the same distance at each side of the said frame, substantially as set forth.

11. An electrode for storage batteries comprising a supporting skeleton frame and a plurality of perforated tubular pockets made from metal of a comparatively high tensile strength and containing active material, the said pockets fitting within the openings in the skeleton frame being flattened to one side at the ends thereof and riveted at said flattened ends to the supporting frame, and extending outwardly substantially the same distance on each side of the said frame, substantially as set forth.

This specification signed and witnessed this 26th day of April, 1905.

THOS. A. EDISON.
JONAS W. AYLSWORTH.

Witnesses:
FRANK L. DYER,
ANNA R. KLEHM.